United States Patent
Numao et al.

(10) Patent No.: US 7,331,519 B2
(45) Date of Patent: Feb. 19, 2008

(54) TRACEABILITY SIGNATURE SYSTEM, SIGNATURE METHOD AND PROGRAM PRODUCT

(75) Inventors: Masayuki Numao, Kawasaki (JP); Yuji Watanabe, Yokohama (JP); Takeo Yoshizawa, Kawasaki (JP); Madoka Yuriyama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/477,695

(22) Filed: Jun. 29, 2006

(65) Prior Publication Data

US 2007/0034687 A1    Feb. 15, 2007

(30) Foreign Application Priority Data

Jul. 1, 2005    (JP) .............................. 2005-193237

(51) Int. Cl.
G06K 5/00    (2006.01)
(52) U.S. Cl. ...................................... 235/380; 235/384
(58) Field of Classification Search ................ 235/380, 235/383, 384; 705/404, 410
See application file for complete search history.

(56) References Cited

U.S. PATENT DOCUMENTS 6,292,437 B1 *  9/2001  Beard .......................... 367/197
7,039,813 B2 *  5/2006  Algazi et al. ............... 713/186

FOREIGN PATENT DOCUMENTS

JP        2004-94510         3/2004

\* cited by examiner

*Primary Examiner*—Uyen-Chau N Le
(74) *Attorney, Agent, or Firm*—Lisa M. Yamonaco; Anne Vachon Dougherty

(57) ABSTRACT

A signature device having an item selection input section which accepts a selection of a group of items formed by combining an item delivered from at least one supplier and an item generated by itself, a path verification information updating section which updates path verification information to verify a delivery route included in the signature information on the delivered item, a signature information preparation section which prepares new signature information from a signature prepared by itself and the updated path verification information with respect to the selected item group, and a signature information transmitting section which transmits the new signature information to the signature verification device. The signature verification device receives the new signature information and verifies the delivery routes for all the items included in the selected item group based on the new signature information.

8 Claims, 13 Drawing Sheets

[Figure 1]
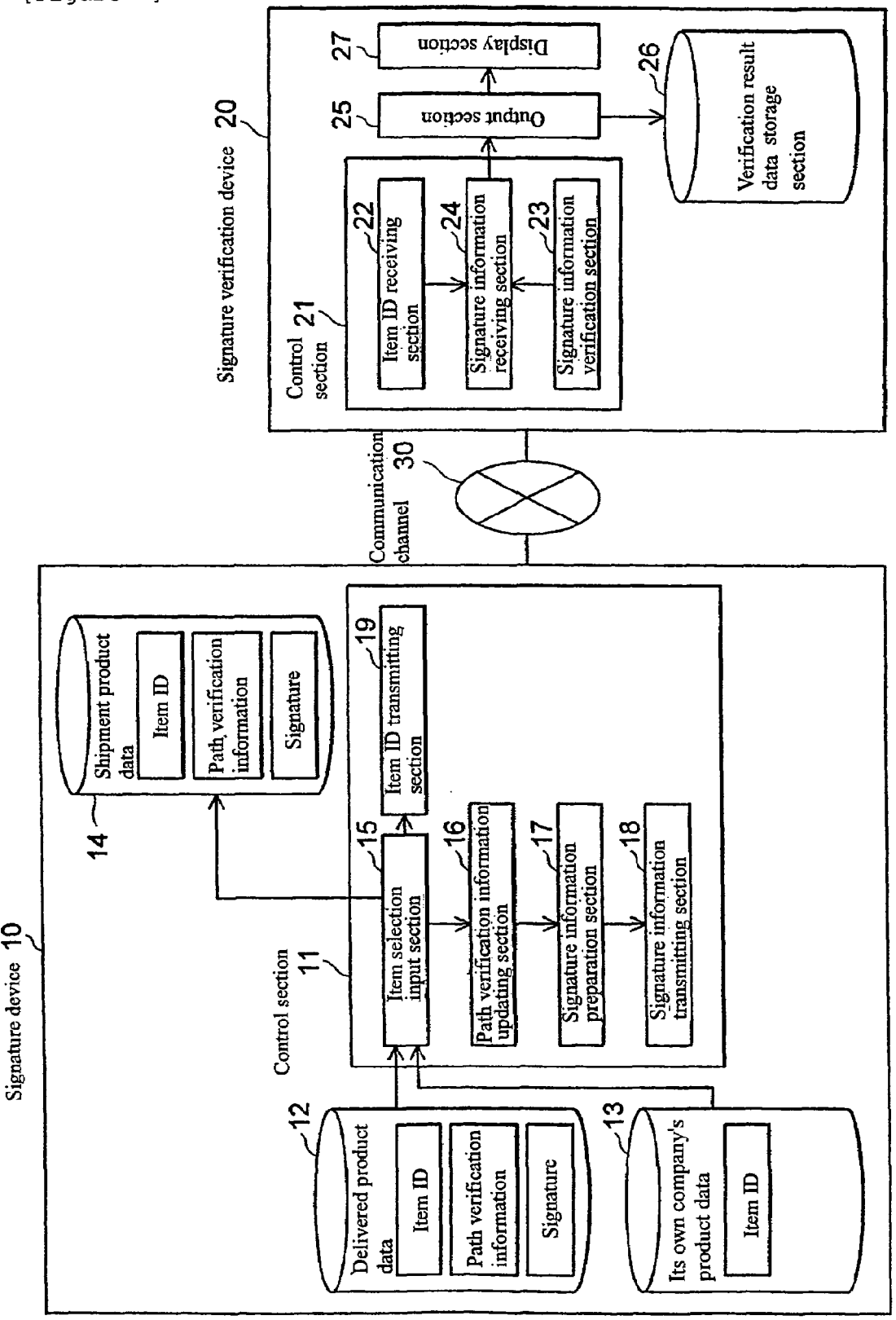

[Figure 2]
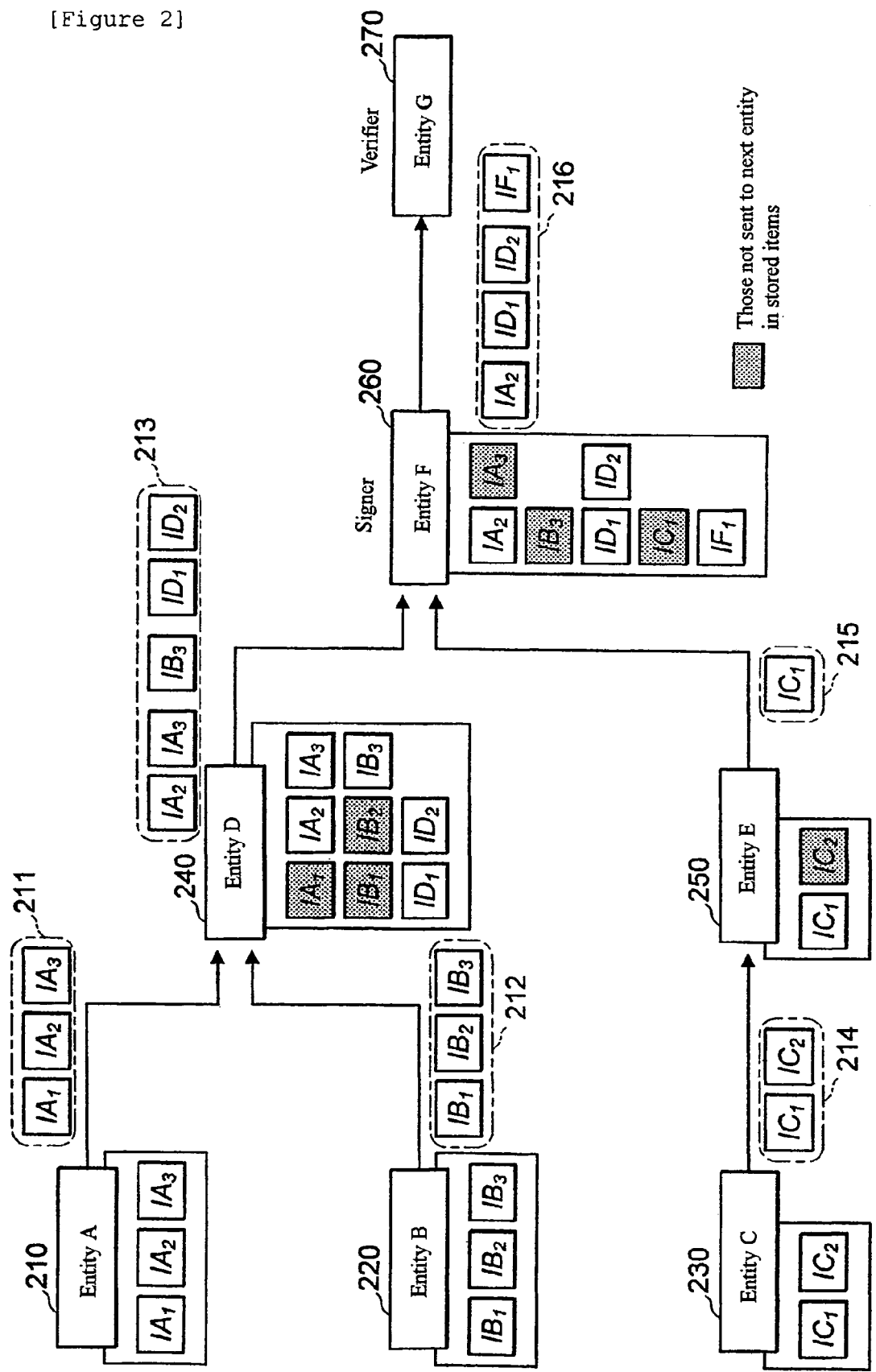

[Figure 3]
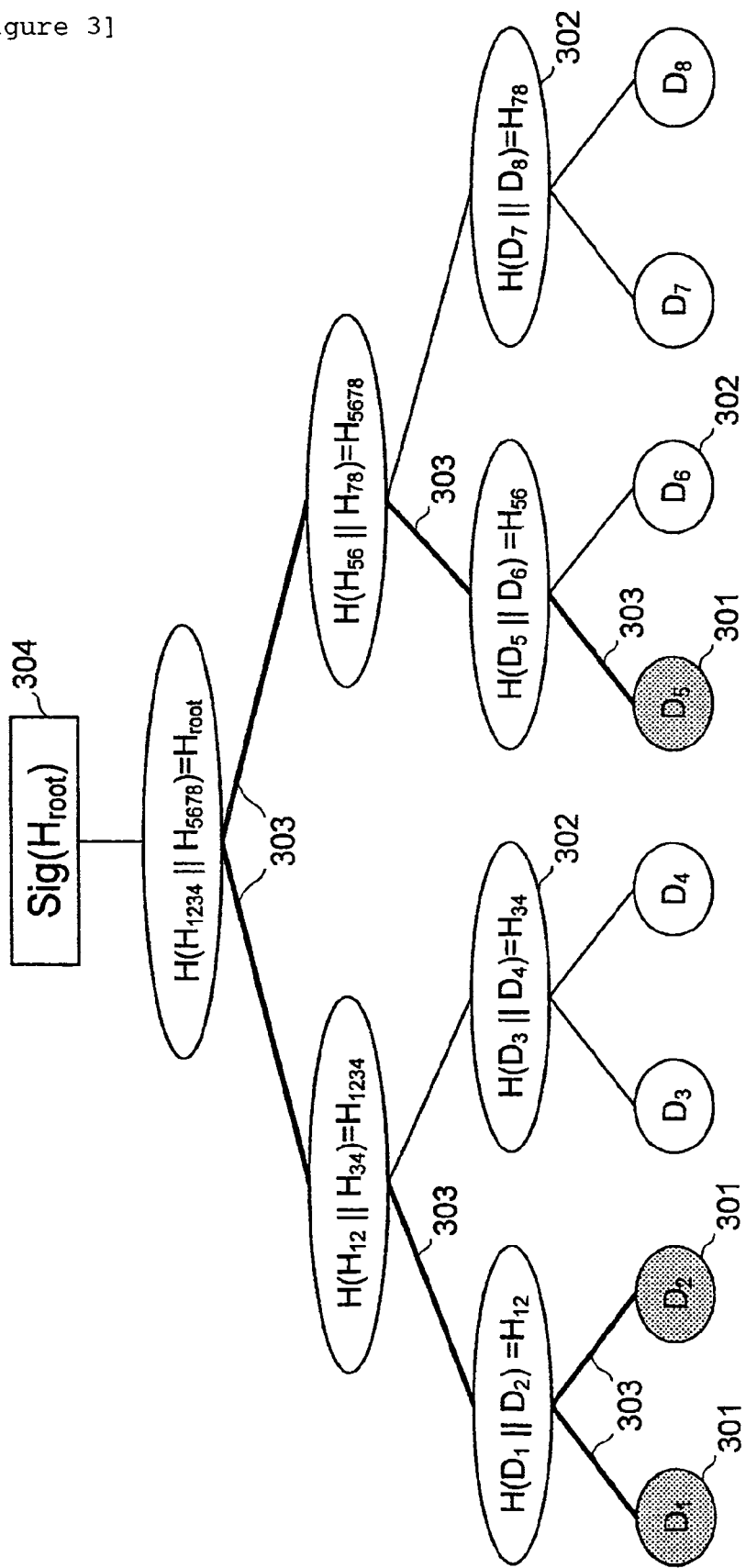

[Figure 4]
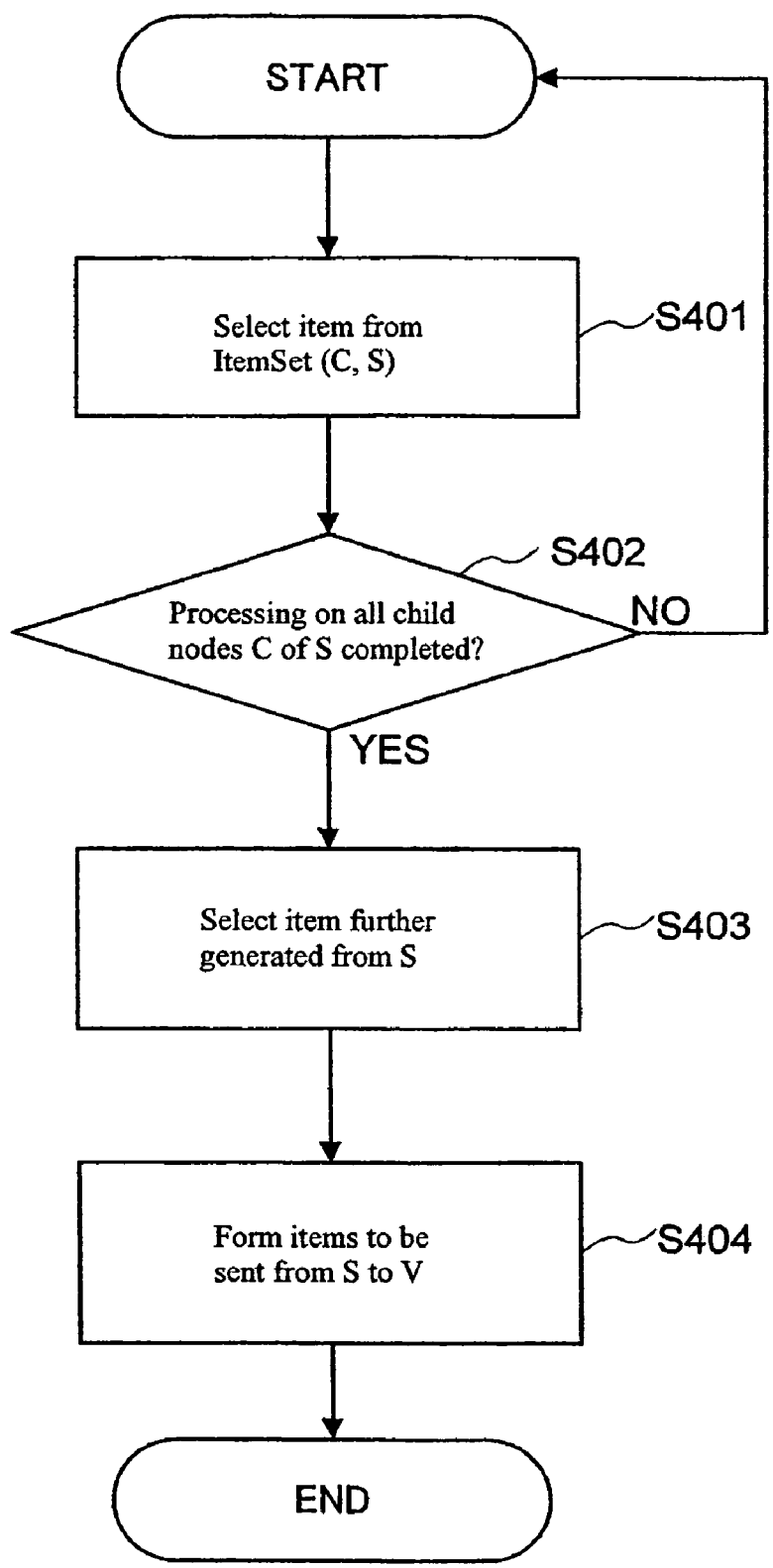

[Figure 5]
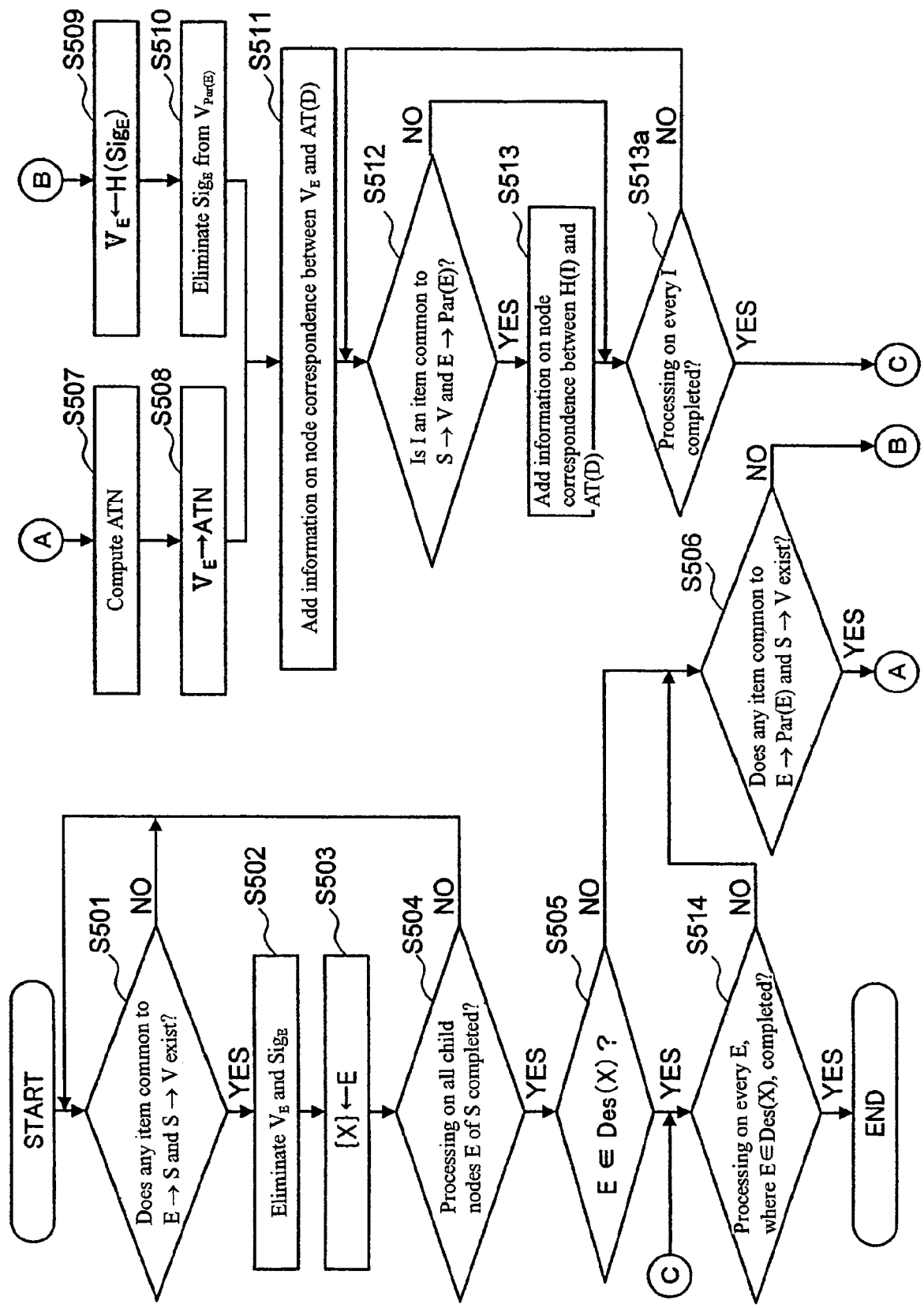

[Figure 6]
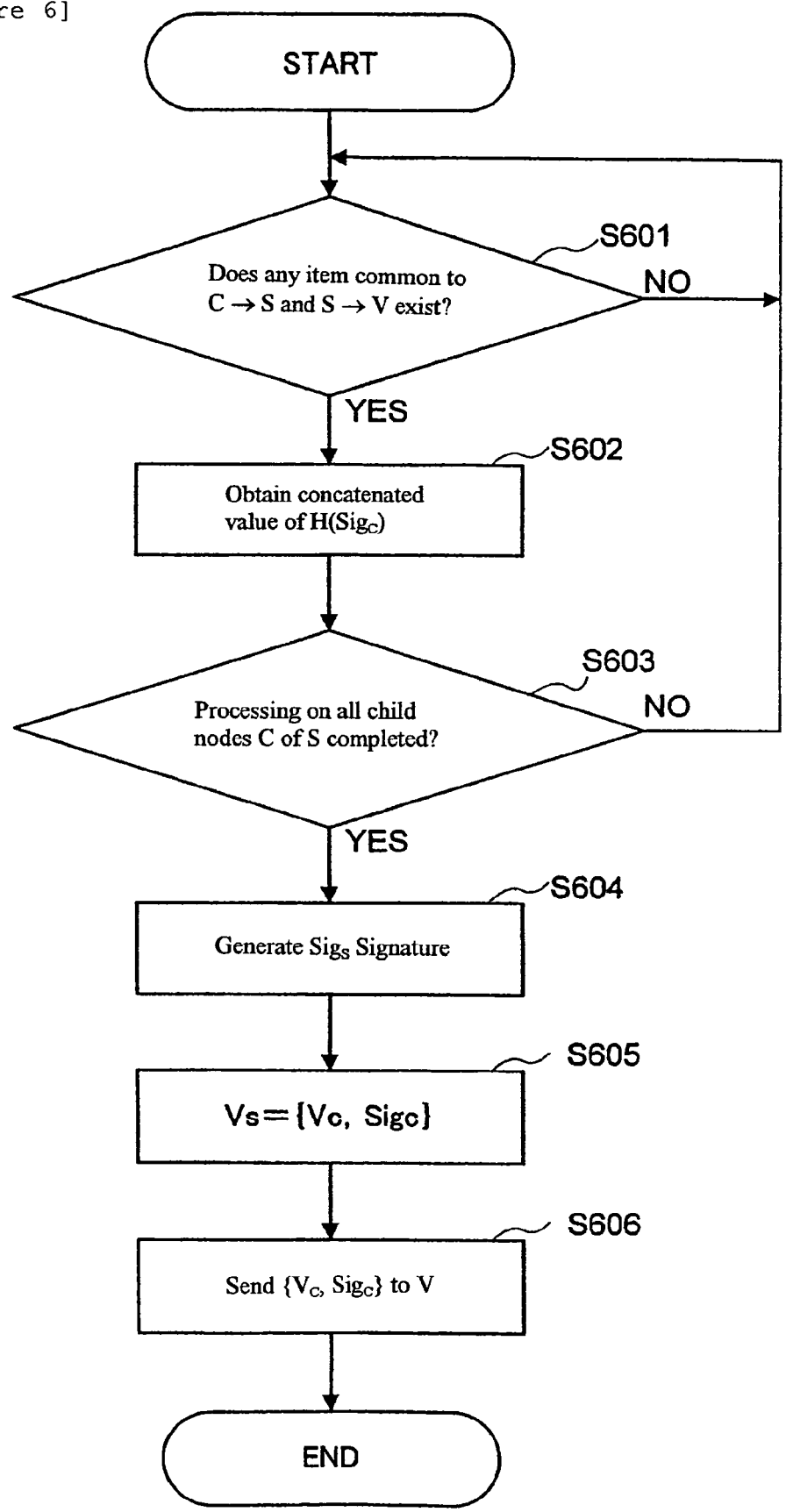

[Figure 7]
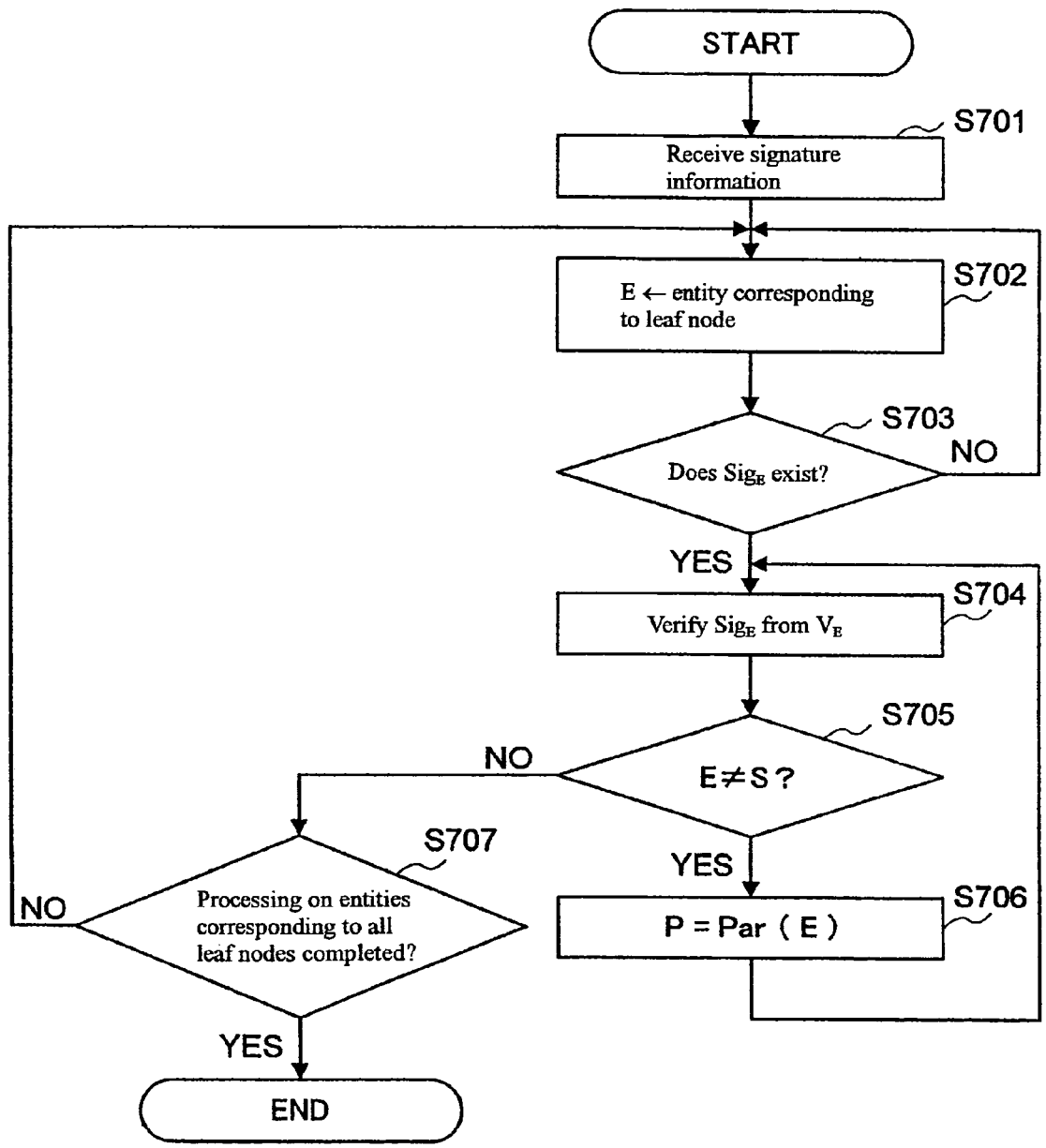

[Figure 8]
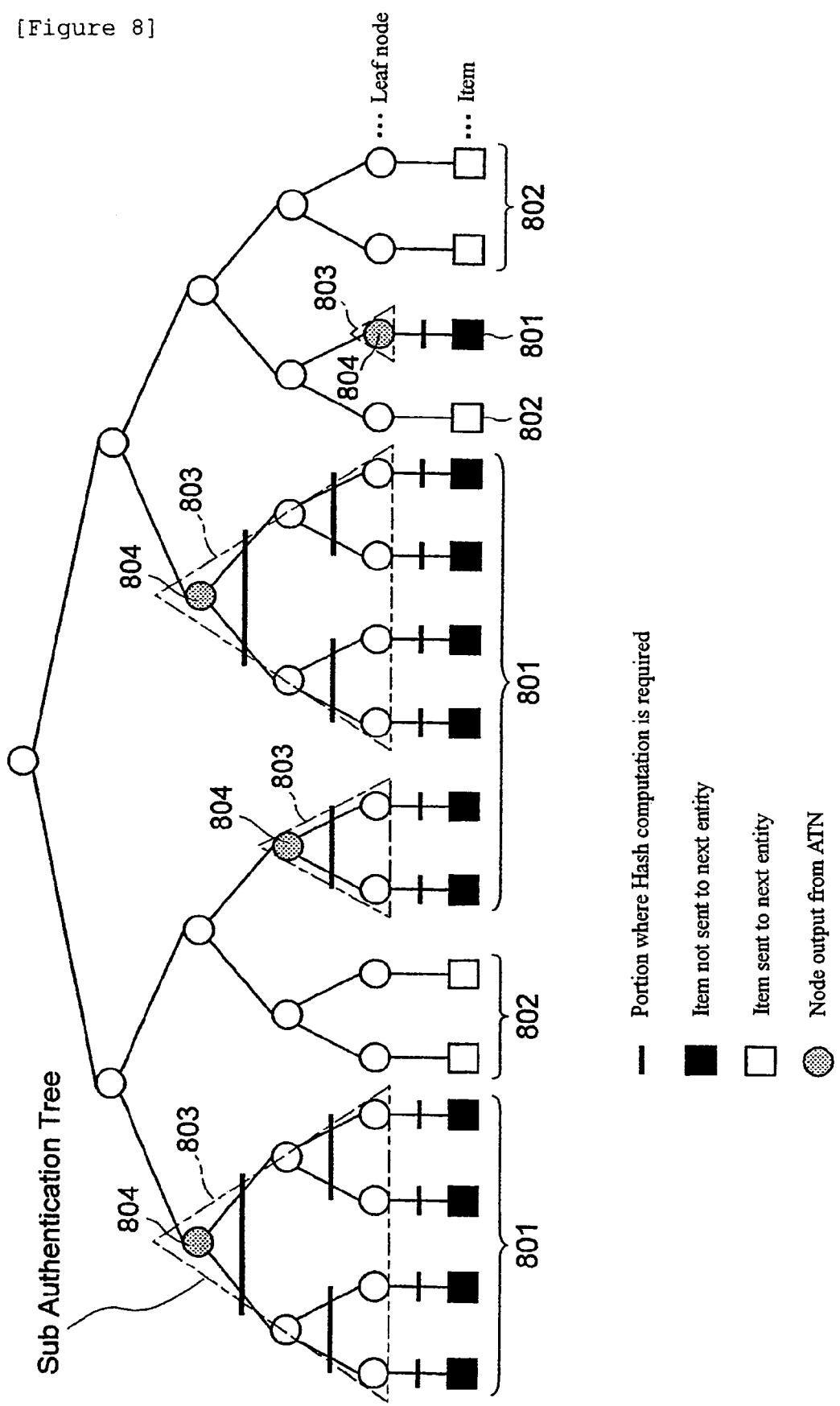

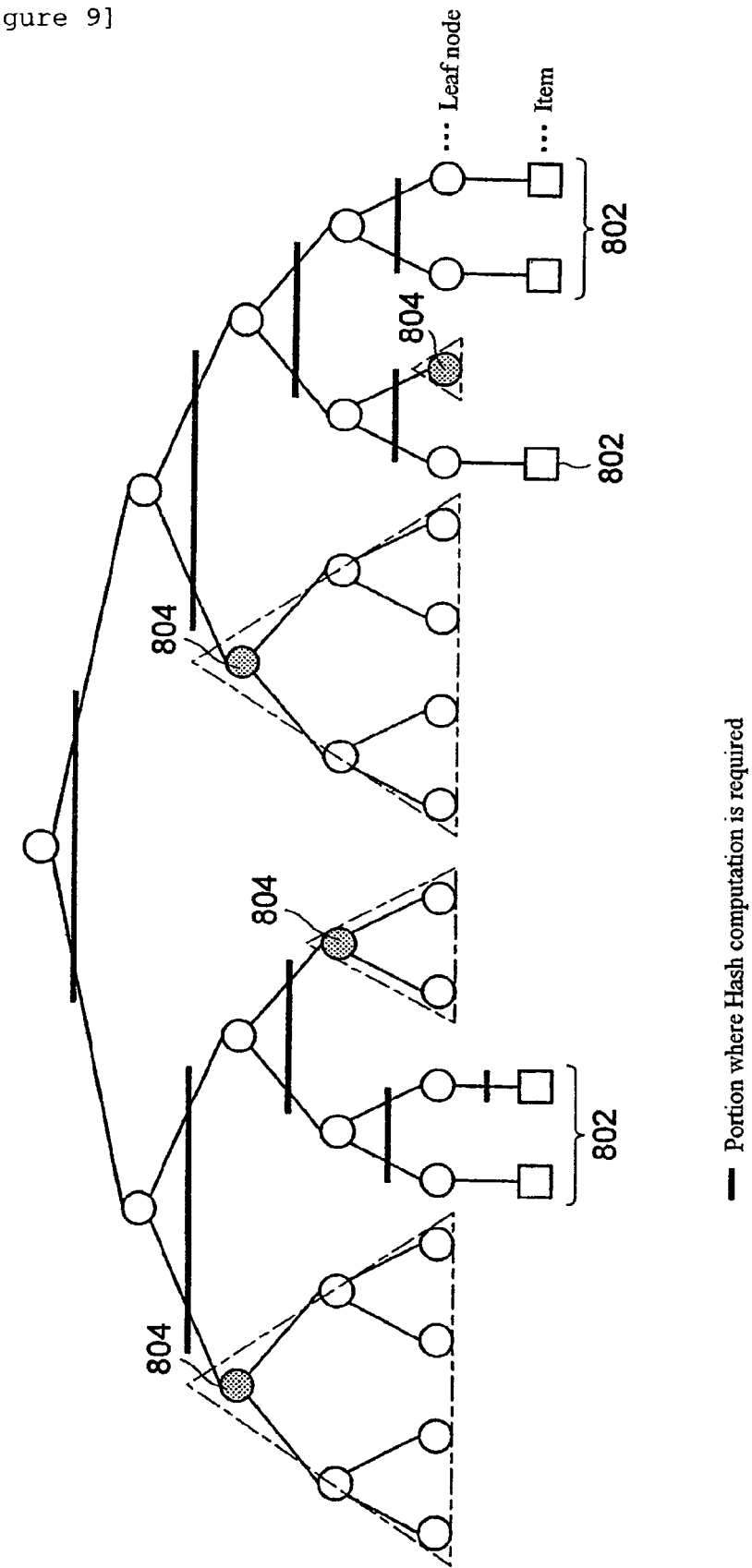
[Figure 9]

[Figure 10]
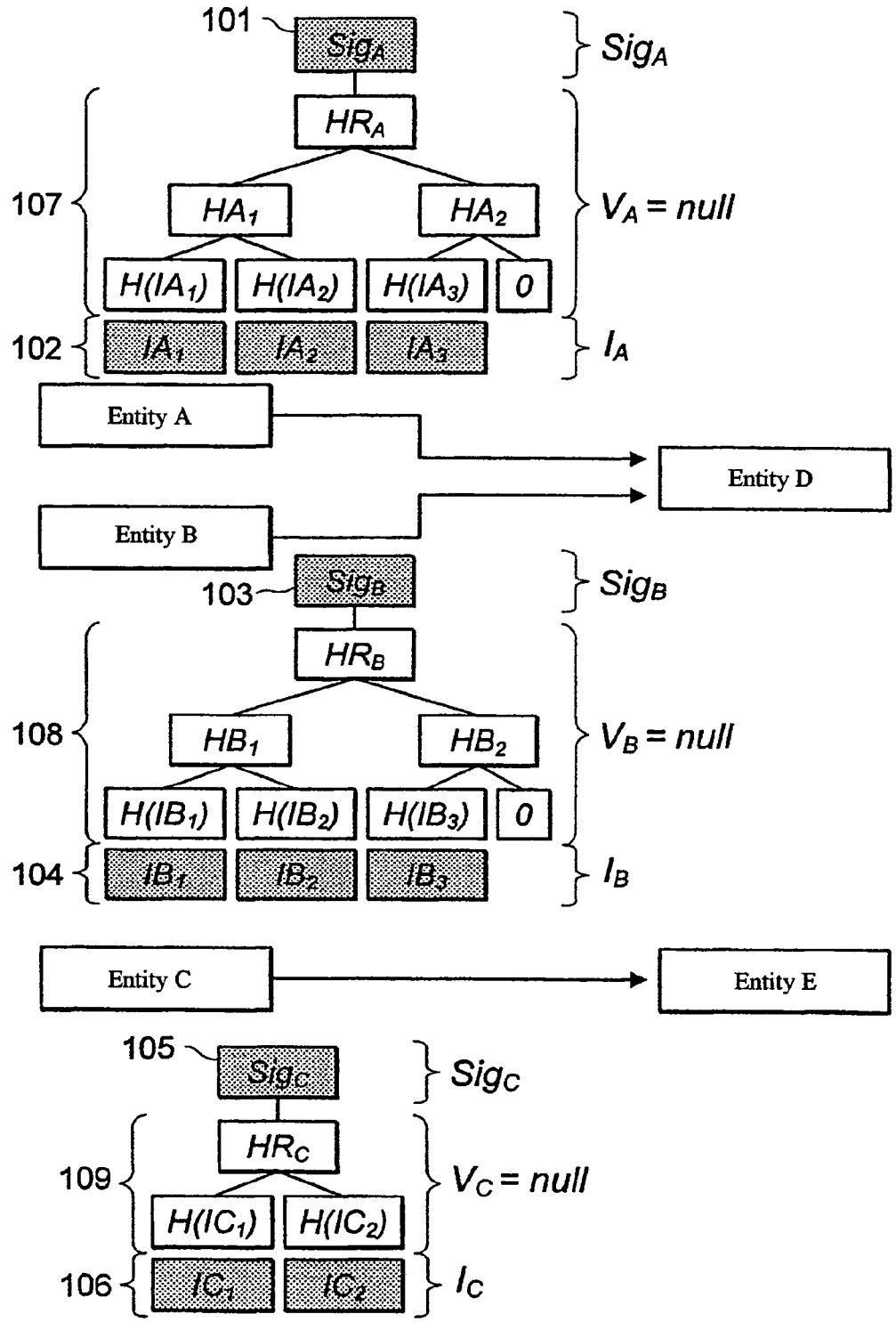
 Information sent to next entity
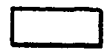 Information not sent to next entity
(Necessary in signature verification process, computable from sent information)

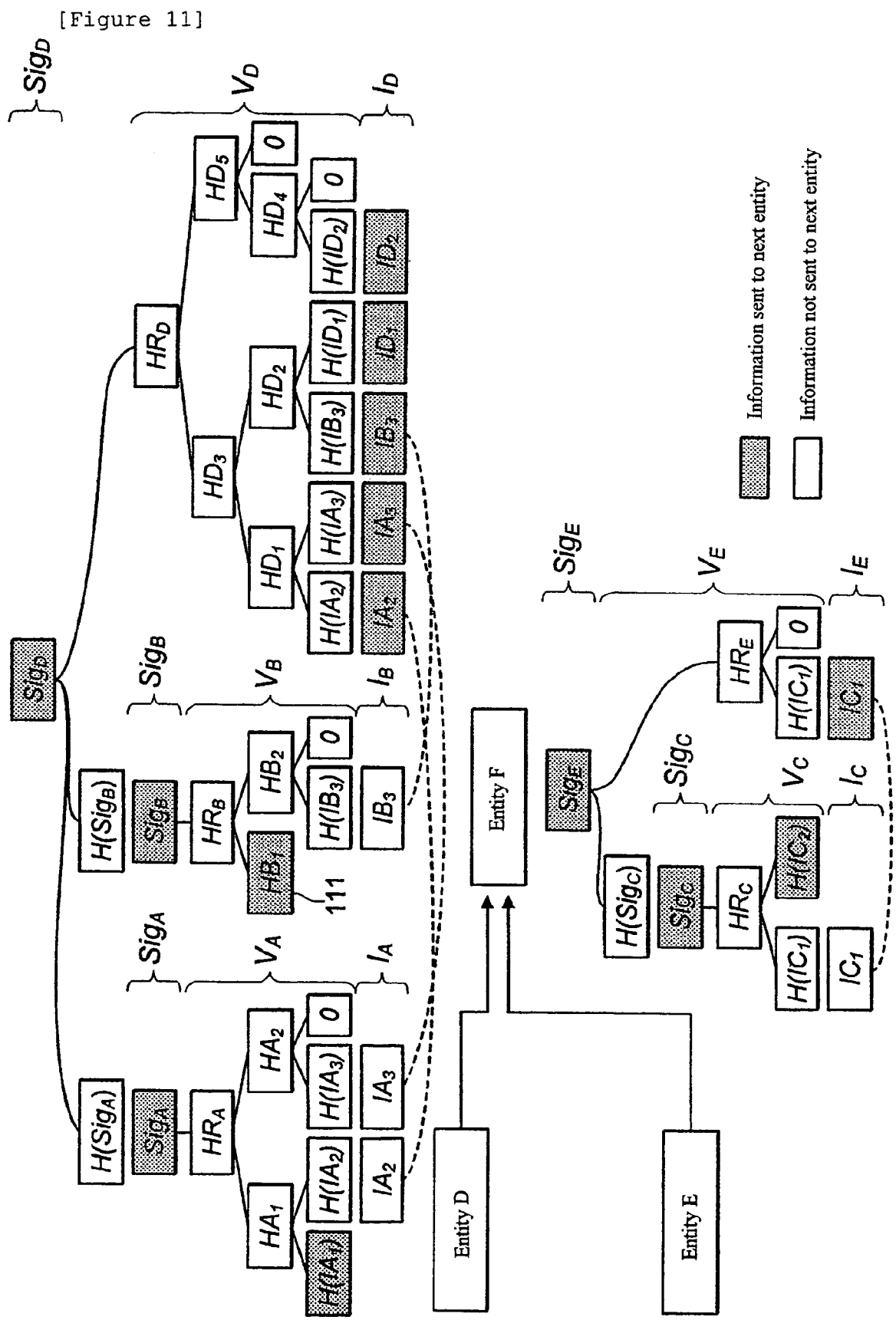
[Figure 11]

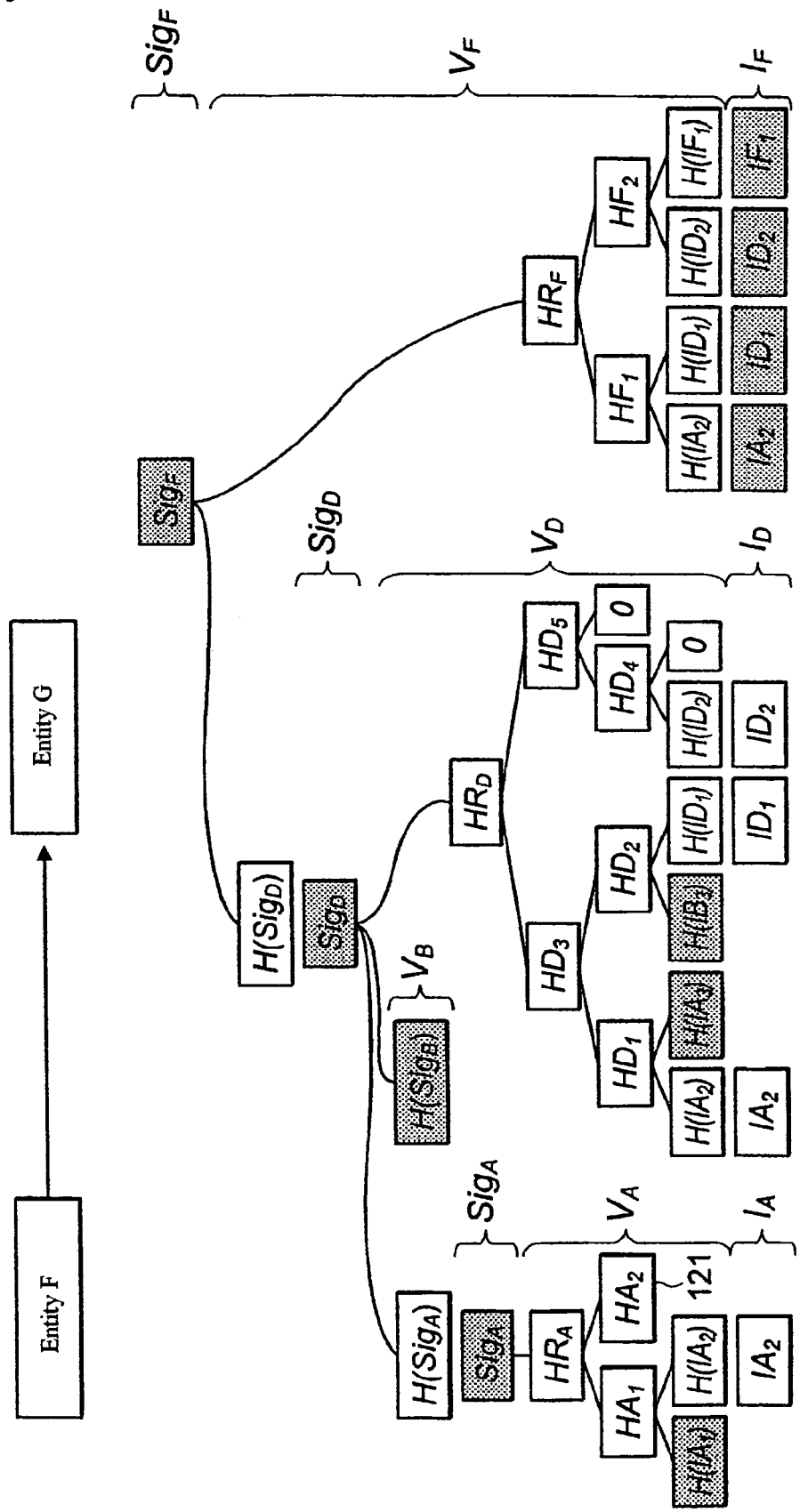
[Figure 12]

[Figure 13]
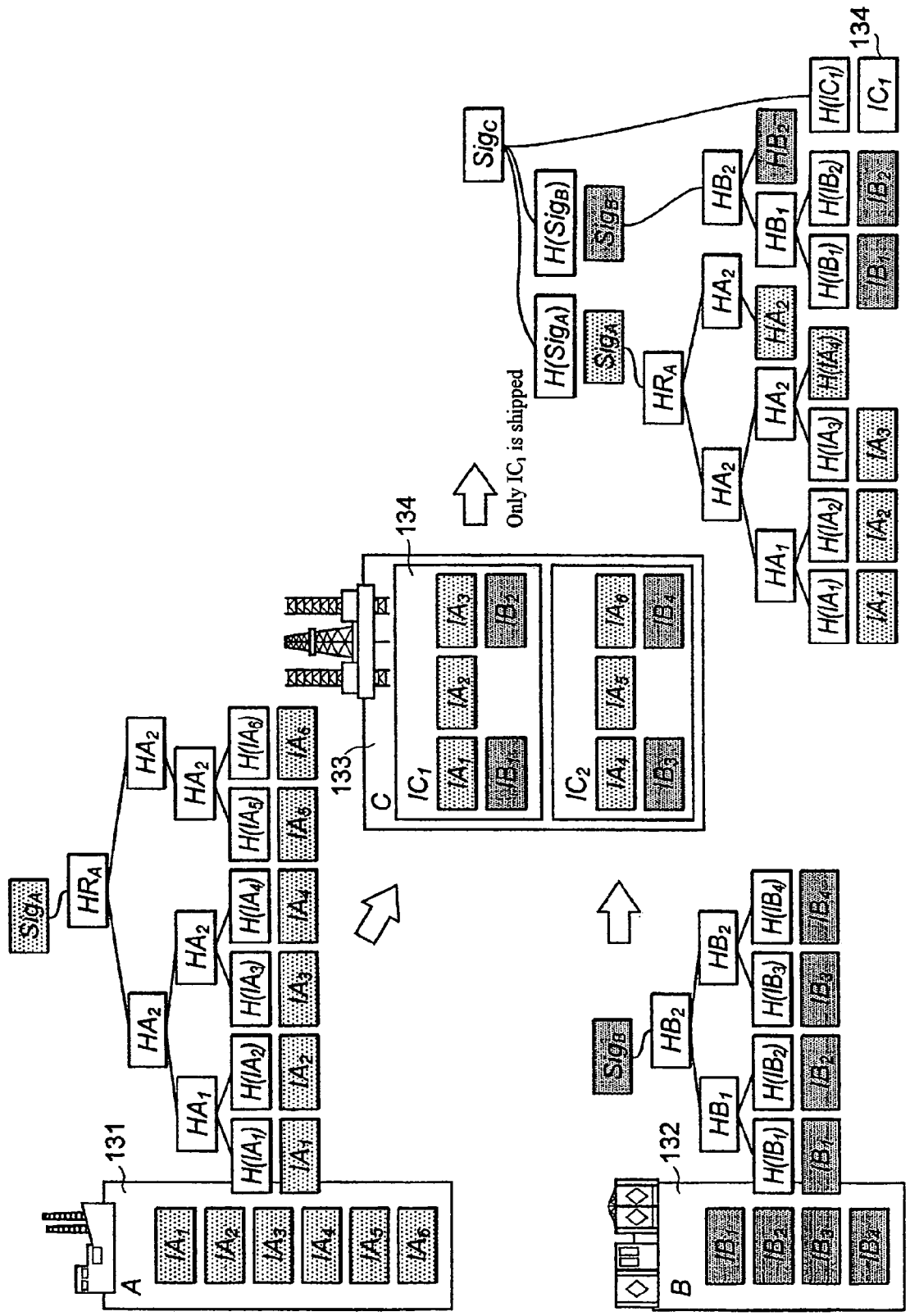

US 7,331,519 B2

TRACEABILITY SIGNATURE SYSTEM, SIGNATURE METHOD AND PROGRAM PRODUCT

FIELD OF THE INVENTION

The present invention relates to a traceability signature system, a signature method and a program product and, more particularly, to a systematic apparatus and a method for preparing a signature for a large amount of items and verifying channels for distribution of the items and a program product for implementation of the apparatus and method.

BACKGROUND OF THE INVENTION

In recent years, problems relating to the reliability of commodities or the like provided to consumers, e.g., motor vehicle recall problems and commodity imitation problems have been perceived. The establishment of traceability of products and commodities (hereinafter referred to as "items") has attracted attention as a chief solution to these problems. Traceability is defined as the "ability to trace the history, application, or location of what is under consideration" (ISO9000: 2000). By a traceability technique, information can be obtained, for example, as to by whom a product was produced and which distribution channel the product was passed through. However, when consideration is given to use of this information among domains between which no trust-based relationship is established, there is a need for a mechanism for assuring the authenticity of the obtained information. A signature method is being generally used as a mechanism for assuring the authenticity of information.

Published Unexamined Patent Application No. 2004-94510 illustrates an example of a grapple with a challenge on assurance of the authenticity of information for traceability. In this example, electronic signatures are included in shipment and buying forms used in commodity distribution to enable verification of channels for commodity distribution. To be more specific, a label writer or the like having an alteration prevention function using a bar code or a two-dimensional code in each form is described.

In a traceability target area, a large amount of items are ordinarily distributed. It is, therefore, supposed that if a signature is written on each individual item, the cost of computation of signatures and verification of the signatures and the amount of signature data itself will considerably increase. Also, when an entity finally receiving a commodity (a being constituting a channel through which an item is passed will be hereinafter referred to as "entity") verifies the entire distribution channel through which the item has passed, it is necessary for the entity to verify signatures written on a shipment form at the time of receiving by inquiring of an agency which certifies the authenticity of all entities concerned with the item. Consequently, an increased number of events of inquiry about entities occur and there is a problem relating to convenience at the time of verification.

A simple method for verifying passage of items through a plurality of entities is conceivable in which each entity writes its signature with respect to IDs for the items (assuming that a unique ID is attached to each item), and the subsequent entity writes its signature on the former signature in a multiple signature manner. However, the cost of computation for signatures and verification of the signatures is high, and this method is not practical in a case where the number of distributed items is large.

To improve the efficiency in a simple way, a process may be performed in which, when a plurality of items are sent from an entity to subsequent entities, the items are treated as one item group and each entity writes its signature with respect to the item group in a multiple signature manner. In this case, performing signature computation one time in each entity with respect to the plurality of items suffices. Also, performing signature verification the number of times corresponding to the number of entities through which the item group has passed suffices (assuming that the number of entities through which the items to be distributed are passed is sufficiently small relative to the number of the distributed items).

A situation where three items with IDs $I_1$, $I_2$, and $I_3$ are passed via three entities A, B, and C will be considered by way of example. When A sends the items to B, it writes a signature $Sig_A (I_1, I_2, I_3)$ with respect to the entire item group formed by combining $I_1$, $I_2$, and $I_3$. $Sig_A (M)$ represents a signature written by using an ordinary signature schema with respect to a message M by the entity A. The entity B then receives it, writes a signature $Sig_B (Sig_A (I_1, I_2, I_3))$ and sends it to C together with A's signature and the items. The entity C can verify A's signature from the received items $I_1$, $I_2$, $I_3$ and can verify B's signature from the verified A's signature. Thus, the entity C can verify the entity path through which the items have passed.

This method, however, does not permit change of the combination of items constituting the item group, (e.g., B changing the item group delivered from A to B by selecting several ones of the delivered items in the item group, newly adding an item to the item group and sending the item group to C. For example, in a case where there is a need to change the composition of items to be delivered from B to C to $I_2$, $I_3$, and $I_4$, C (verifier) that will receive the items cannot verify A's signature if $I_1$, does not exist.

SUMMARY OF THE INVENTION

It is, therefore, an object of the present invention to provide an efficient path verification method which enables, during passage of a large amount of items through a plurality of entities, verification of each of groups of entities through which the items are respectively passed and the order of the entities while permitting each entity to freely change the composition of an item group.

The present invention provides a system, a method and a program product described below.

Disclosed is a multiple signature system which verifies a delivery route for an item which is a manufactured product or a commercial product. The system has a signature device which generates signature information on items and a signature verification device which verifies the signature information on received items. Both devices are connected so as to communicate with each other. The signature device has an item selection input section which accepts a selection of a group of items formed by combining an item delivered from at least one supplier and an item generated by itself, a path verification information updating section which updates path verification information to verify a delivery route included in the signature information on the delivered items, a signature information preparation section which prepares new signature information from a signature prepared by itself and the updated path verification information with respect to the selected item group, and a signature information transmitting section which transmits the new signature information to the signature verification device. The signature verification device has a signature information receiving section which receives the new signature information, and a signature information verification section which verifies the delivery routes for all the items included in the selected item group based on the new signature information.

Also disclosed is a multiple signature method, wherein the signature device carries out a step of accepting a selection of a group of items formed by combining an item delivered from at least one supplier and an item generated by itself, a step of updating path verification information to verify a delivery route included in the signature information on the delivered items, a step of preparing new signature information from a signature prepared by itself and the updated path verification information with respect to the selected item group, and a step of transmitting the new signature information to the signature verification device. The signature verification device carries out a step of receiving the new signature information, and a step of verifying the delivery routes for all the items included in the selected item group based on the new signature information.

Also disclosed is a program product for enabling a computer to perform the above-described functions.

According to the present invention, although each entity writes a signature on the entire combination of items to be sent out, subsequent entities can freely change the combination of received items and send out the changed combination of items while maintaining the verifiability of the received signature. Use of the present invention ensures that, in an environment such as a supply chain in which a multiplicity of items are distributed, verification as to which entity each item has been passed through can be performed with efficiency.

BRIEF DESCRIPTION OF THE DRAWINGS

The invention will now be described with reference to the appended figures in which:

FIG. 1 is a functional block diagram of an embodiment of a signature system;

FIG. 2 is a diagram showing an example of the flow of items between entities;

FIG. 3 is a diagram showing the concept of a binary Authentication Tree;

FIG. 4 is a flowchart of an item selection step;

FIG. 5 is a flowchart of a path verification information updating step;

FIG. 6 is a flowchart of a signature preparation and transmission step;

FIG. 7 is a flowchart of signature verification step;

FIG. 8 is a sample diagram relating to the amount of computation of ATN;

FIG. 9 is a sample diagram relating to the amount of computation of ATR;

FIG. 10 is a diagram showing an example (1) of signature and verification;

FIG. 11 is a diagram showing an example (2) of signature and verification;

FIG. 12 is a diagram showing an example (3) of signature and verification; and

FIG. 13 is a diagram schematically showing an embodiment of implementation.

DETAILED DESCRIPTION OF THE INVENTION

The present invention will be described with respect to an embodiment thereof. The embodiment described below, however, is not limiting the scope of the invention set forth in the appended claims, and all combinations of components described in the description of the embodiment are not necessarily indispensable to the solution according to the present invention.

FIG. 1 is a functional block diagram of a multiple signature system which represents an embodiment of the present invention. This system is constituted by a signature device 10 which generates a signature and a signature verification device 20 which verifies the generated signature, the signature device 10 and the signature verification device 20 being connected to each other via a communication channel 30. The signature device 10 and the signature verification device 20 may be implemented on a computer system such as a PC or an information terminal or may be implemented as a specific-purpose device. While only one signature device 10 and one signature verification device 20 are illustrated in FIG. 1 for simplification of illustration, at least one signature device 10 exists in each of entities forming channels for distribution of items. It is not necessary that a verification device 20 exist in each entity. The verification device 20 may exist in some entities which need verification. One entity may verify a signature from another entity, write its signature and send its signature to still another entity. Therefore, the signature device 10 and the signature verification device 20 may co-exist in one entity. The communication channel 30 may be an ordinary communication network such as the Internet or a dedicated line. Alternatively, the communication channel 30 may be not a communication line itself but a means capable of sending and receiving data by attaching information to items.

The signature device 10 has the function of generating a digital signature with respect to an item group to be shipped and transmitting it to the signature verification device 20. The item group is a set of items to be sent from an entity to another entity. The signature device 10 stores, in a delivered product data storage section 12, information on items delivered from other entities. The signature device 10 has its own company's product data storage section 13 containing information on items produced by itself, a shipment data storage section 14 storing data on a group of items to be shipped, and a control section 11 which performs overall control of the device. Generation of an item by each entity itself includes forming (assembling) a new item set from a plurality of delivered items even if there is no item produced by the entity.

The control section 11 accepts, through an item selection input section 15, a selection from items constituting an item group to be shipped. Selection of each item may be input by a user or by means of a table or the like by which the items and the entities to which the items are to be shipped are associated with each other. The control section 11 has a path verification information updating section 16 and a signature information preparation section 17 for preparing signature information with respect to an item group to be shipped. The control section 11 also has a signature information transmitting section 18 for transmitting prepared signature information to the signature verification device 20. The signature information includes path verification information which is a past channel history of delivered items and a signature written by the signature device with respect to the shipped articles. The control section 11 may also have an item ID transmitting section 19 which transmits an item ID for each of shipped articles to the signature verification device 20. The functions of the path verification information updating section 16 and the signature information preparation section 17 which are core components of the control section 11 will be described in detail with reference to a path verification information updating algorithm and a signature algorithm described below.

The signature verification device 20 has a control section 21, an output section 25, a display section 27 and a verification result data storage section 26. The display section 27 and the verification result data storage section 26 are not indispensable components, but it is sufficient to have at least one of them. The control section 21 receives signature information on an item group from the signature device 10 through a signature information receiving section 23. A signature information verification section 24 verifies received signature information using item IDs. Each item ID is attached to the corresponding item or received from the signature device 10. The signature verification device 20 can trace paths through which all items have passed by verifying received corresponding signature information. The signature verification function of the signature information verification section 24 will be described in detail with reference to a signature verification algorithm described below. The results of verification may be displayed on the display section 27, which is a liquid crystal display device or the like, or may be stored in the verification result data storage section 26.

The signature algorithm used by the above-described signature device 10 and the verification algorithm used by the signature verification device 20 will be described in detail. Necessary definitions and a fundamental concept "Authentication Tree" (or Merkle tree) will first be described as prerequisites and the algorisms will be subsequently described.

The following definitions will be relied upon for the ensuing description:

A person or a mechanism which verifies an entity channel for each item through which the item delivered from an entity has passed will be referred to as a "verifier". An item is delivered to a verifier by only one entity. This entity will be referred to as a "signer". An item delivered from a signer to a verifier is an item delivered to the signer via zero or more entities prior to the signer. Entities through which an item is passed are assumed to write their signatures by the same method as described below.

FIG. 2 shows an example of the flow of items between entities, illustrating a situation where each of entities A to E (210 to 250) selects several ones of items held therein and sends the selected items to the next entity and an entity F holds a certain number of items as a result of sending from the entities A to E, selects four of them and is about to send the selected items to an entity G (270). In this example, the entity F is a signer while the entity G is a verifier. The signer delivers to the verifier four items (216) with IDs: $IA_2$, $ID_1$, $ID_2$, and $IF_1$. Each item has passed zero or more entities before the signer. A set of items sent from an entity to another entity will be referred to as an "item group". In the example shown in FIG. 2, the item group sent from the entity F to the entity G is $\{IA_2, ID_1, ID_2, IF_1\}$ (216), which is hereinafter expressed as ItemSet(F, G).

Also, it is assumed that entities through which items are passed form a tree structure in which each entity delivering an item is a child and the entity receiving this item is a parent, as shown in FIG. 2. A set of entities corresponding to child nodes of one entity E is expressed as Chi(E); the entire set of entities corresponding to child nodes and other descendent nodes of the entity E is expressed as Des(E); and the entity corresponding to the parent node of the entity E is expressed as Par(E). Also, H represents a unidirectional hash function; ‖represents a concatenation of character strings; and $Sig_E$ represents a signature written by entity E using a signature schema arbitrarily selected.

A fundamental concept "Authentication Tree" (R. Merkle. A digital signature based on a conventional encryption function. In Proceedings of Crypto '87, 1987.) will be described with respect to the signature algorithm and verification algorithm described below.

An "Authentication Tree (or Merkle tree)" refers to a method in which data on which a signature is to be created are treated as leaf nodes of a tree structure; each intermediate node takes as its value a hash of concatenation of the values of the corresponding child nodes; and a signer writes a signature on this root node. Doing so ensures that at the time of verification of a signature on a plurality of data groups (corresponding to leaf nodes) by a verifier of this signature, the verifier can verify the signature if brother nodes of all the nodes on the paths from the route node to the leaf nodes corresponding to the data (other than the nodes themselves on the-paths) are present, even if not all the other data items on which the signature is placed are present. A discussion will be made by assuming that an "Authentication Tree" is the simplest binary tree (if the number of data groups is not $2n$, a complete binary tree cannot be formed but data 0 is added to compensate for the deficiency.)

FIG. 3 shows an example of the above. In this figure, $D_1$ to $D_8$ represent data on which a signature is to be placed. A signer writes its signature on the root node ($H_{root}$) of the Authentication tree. It is assumed here that a verifier has obtained data $\{D_1, D_2, D_5\}$ (301). In this situation, information necessary for verification of the signature other than the data is nodes that are brother nodes of the nodes on the paths from the nodes corresponding to $D_1$, $D_2$, and $D_5$ to the route node (thick lines 303 in FIG. 3) but do not exist on these paths (excluding a value-0 node). In FIG. 3, this information is nodes $\{H_{34}, D_6, H_{78}\}$ indicated by 302. The verifier can compute the values of all the other nodes by itself if these nodes are present. Therefore, the verifier can verify the authenticity of the obtained data ($D_1$, $D_2$, and $D_5$ in the example shown in FIG. 3) by computing the values of the route node and verifying the signature.

In the following, AT (D) represents an Authentication Tree having leaf nodes corresponding to all elements of a data set D, and ATR(D) represents the value of the root node. With respect to $L \subseteq D$, a set of (the values of) nodes that are brother nodes of the nodes on the paths from the elements of L (leaf nodes of AT(D)) to ATR(D) on AT(D) but do not exist on the paths is expressed as ATN(L/D). In the example shown in FIG. 3, if $D=\{D_i|i=1, \ldots, 8\}$, $ATN(\{D_1, D_2, D_5\}/D)=\{H_{34}, D_6, H_{78}\}$.

The signature algorithm and the verification algorithm in the embodiment of the present invention will be described on the basis of the above-described definitions and concept, followed by description of the amount of computation required for each of them.

In the following, S represents a signer and V represents a verifier. S's signature in the embodiment of the present invention takes the form of $\{V_S, Sig_S\}$. $V_S$ is information necessary for verification of paths before S (referred to as path verification information), including information on signatures $\{V_C, Sig_C\}$ by every C, where $C \in Chi(S)$. Since according to the definition all entities $E \in Des(S)$ write signatures by the signature method in this embodiment of the present invention, $V_E$ contained in the signature on one entity E contains the signature $\{V_G, Sig_G\}$ by every G, where $G \in Des(E)$ in the hierarchy.

(Step 1) Item Selection

S selects several ones of items ItemSet(C,S) with respect to every C, where C∈Chi (S), and forms ItemSet(S,V) by combining the selected items and an item (or items) generated from S. FIG. 4 shows a flowchart of item selection.

(Step 2) Path Verification Information Update

S updates $V_E$ with respect to every E, where E∈Des (S), as described below (with every $V_E$ being contained in $V_C$, as mentioned above). S eliminates $V_E$ and $Sig_E$ with respect to such E that (Par(E)=S)∧(ItemSet(E,S)∩ItemSet(S,V)= Φ). If the above-described entity is X, with D={H(I)∥ItemSet(E,Par(E))} for all the entities E∈Des(S) not corresponding to Des(X), and ATN({H(I)∥I∈ItemSet(E,Par(E))∩ItemSet(S,V)}/D)

is computed to be set as a new $V_E$. In this (step 2), however, {$V_{chi(E)}$, $Sig_{Chi(E)}$} is held without being changed. At this time, $V_E$=($Sig_E$) and $Sig_E$ is eliminated from Vpar(E) if ItemSet(E,Par(E))∩ItemSet(S,V)=Φ. S cannot directly obtain ItemSet(E, Par (E)) through this computation but can compute the new $V_E$ from the hash value contained in the old $V_E$. The value other than $Sig_{chi(E)}$ or H($Sig_{Chi}$(E)) contained in $V_E$ coincides with one of the nodes in AT(D). Accordingly, information enabling recognition as to which value corresponds to which node (node position information or the like) is added at this time. Information as to which node in AT(D) (necessarily a leaf node) the hash value H(I) of each I, where I∈ItemSet(E, Par(E))∩ItemSet(S,V), corresponds to is also added. Although methods for these are not specified herein, a technique of encoding the tree structure is applicable. FIG. 5 shows a flowchart of updating of path verification information in step 2. For simplification, it is assumed with respect to FIG. 5 that an item to be sent from S to V exists, that is, ItemSet(S, V)≠Φ.

(Step 3) Signature Preparation

With respect to ∥H($Sig_C$) which is a value obtained by concatenating all the hash values H ($Sig_C$) of signatures by all Cs, where C∈Chi (S) such that ItemSet(C,S)∩ItemSet(S,V)≠Φ for all the item sets, and with respect to the item set ItemSet (S,V) about to be sent to V, S writes a signature in the form of $Sig_S$(ATR({H(x)∥x∈ItemSet(S,V)})∥(∥H($Sig_C$))

and sets this signature as $Sig_S$.

(Step 4) Transmission of Items and Signature

S sets $V_s$={$V_c Sig_C$} (C represents all the entities, where C∈Chi(S)) and sends item group $I_s$=ItemSet(S,V) and signature information {$V_s$, $Sig_S$} to V. FIG. 6 shows a flowchart of the above-described signature preparation step 3 and transmitting step 4.

V receiving the items ItemSet(S,V) and signature information {$V_s$, $Sig_S$} from S verifies $Sig_E$ from information contained in $V_E$ and the item ID contained in ItemSet (S,V) with respect to every E, where E∈Des(S), to verify the paths for all the items.

(Step 1)

$Sig_E$ is verified from $V_E$ With respect to entity E for which $Sig_E$ exists and no $Sig_{chi(E)}$ belongs to $V_E$. At this time, $V_E$ contains ATN({H(I)∥I∈ItemSet(E, Par(E))∩ItemSet(S,V) }/D) for D=H(I)∥I∈ItemSet(E, Par(E))}, and other information {H(I)↑I∈ItemSet(E, Par(E))∩ItemSet(S,V)} necessary for verification of AT(D) can be computed from the IDs for the items contained in ItemSet (S,V). Therefore ATR(D) can be computed on the basis of these sorts of information to verify $Sig_E$.

(Step 2)

If E in step 1 is E≠S, P=Par(E) is set with respect to all Es and $Sig_P$ is verified in the same way as in step 1. If E=S, P=E is set and the process moves to (step 3). At this time, $V_P$ contains $Sig_{Chi}$(P). D={H(I)∥I∈ItemSet(P, Par(P))} is set and ATR(D) ∥(∥H($Sig_{Chi(P)}$)) is computed to verify $Sig_P$. This step is repeated by setting P=Par(P).

(Step 3) If after repeating step 2, P=S and verification of $Sig_S$ is successful, verification of the paths for all the items is completed. FIG. 7 shows a flowchart of the verification algorithm.

The amount of computation for signature, the amount of computation for verification of signatures and the memory efficiency in the computation in the embodiment of the present invention will be described below. For simplification, it is here assumed that |ItemSet (E, Par (E))| of any of entities E is some power of 2.

The amount of computation of ATN and ATR used in the algorithm in the embodiment of the present invention will be described. In a case where, as shown in FIG. 8, several items (801) are removed while the other items (802) are sent to the next entities, there is a need to perform computation of ATN from the hash values of the items not sent, with respect to nodes indicated by 804 in FIG. 8. In the following, the cost of computation of the value of each node in the Authentication Tree (hash computation on concatenation of two values) and the cost of computation of the hash value of an ID for an item are assumed to be equal to each other and an Authentication Tree having as leaf nodes the hash values of all items (801 and 802) will be referred to as AT.

Computation of ATN is equivalent to computation of the values of root nodes (804) of a plurality of Authentication trees (represented by triangles 803 in FIG. 8, referred to herein as "Sub Authentication Tree") having as leaf nodes the hash values of IDs (801) for the removed items and formed as sub-trees of AT. For computation of the values of the root node of a whole Authentication Tree having a complete set of leaf nodes, it is necessary to perform hash computation n−1 times if the number of leaf nodes is n. Accordingly, if the number of leaf nodes of each Sub Authentication Tree is $n_i$ and the number of Sub Authentication Trees is t, the amount of computation of ATN including computation of the hash values of IDs for items (the number of times hash computation is performed) is $$\sum_{i=1}^{t}(2n_i - 1)$$

If the total number of removed items is n', the order of the number of times hash computation is performed is O(n').

Description will next be made of the amount of computation of ATR. In the embodiment of the present invention, computation of ATR is performed from delivered items (802) and nodes (804) output from ATN (the same discussion as the following also holds for a case where there is no ATN output). The amount of computation of ATR (the number of times hash computation is performed) including computation of the hash values of IDs for items is equal to the result of subtraction of the number of times ATN hash computation is performed necessary for making the current Authentication Tree from the number of times hash computation is performed on the Authentication Tree having the complete set of leaf nodes. Accordingly, if the number of leaf nodes in the complete set of leaf nodes of the Authentication Tree is n, the amount of computation of ATR is $$2n - 1 - \sum_{i=1}^{t}(2n_i - 1)$$

If the total number of removed items is n', the order of the number of times hash computation is performed is O(n−n').

Description will be made of the amount of computation of the signature algorithm in the embodiment of the present invention. In signature algorithm step 1, only a selection of items to be sent to the next entity is made. Therefore, processing in this step is not included in the amount of computation. In the signature algorithm (step 2), path verification information is updated. If the number of entities (ItemSet(E, Par(E))∩ItemSet(S,V)≠Φ) associated with the items sent to the next entities is m, the amount of computation (the number of times hash computation is performed) in step 2 is as expressed by the following expression since computation of ATN is mainly performed in step 2:

$$\sum_{j=1}^{m}\sum_{i=1}^{t_j}(2n_{ji} - 1)$$

wherein $t_j$ represents the number of hash values contained in path verification information $V_{Ej}$ on entity $E_j$ but not contained in $V_{chi(Ej)}$ (corresponding to the number of Sub Authentication Trees each having this hash value as its root node), and $n_{ji}$ represents the number of leaf nodes of the Sub Authentication Trees each having an index i, where i is an index of the Sub Authentication Tree with the hush value contained in $V_{Ej}$ as a root node.

In the signature algorithm (step 3), computation (ATR) of the root node of the Authentication Tree formed with respect to the items to be sent to the next entities and having the complete set of leaf nodes, computation of the hash values of the signatures on the immediately preceding entities, and computation of the signature values for them are performed. In (step 3), therefore, hash computation is performed (2n−1+p) times and signature computation is performed one time. In this expression, n is the number of items sent to the next entities (|ItemSet(S,V)|), p is the number of entities, where E∈Chi(S) and ItemSet(E,S)∩ItemSet(S,V)≠Φ.

Accordingly the amount of computation of this signature algorithm is such that the order of the number of times hash computation is performed is O(mn'+n) and the order of the number times signature computation is performed is O (1). The value n' is assumed to be the average of

|ItemSet(E, Par(E))|−|ItemSet(S,V)∩ItemSet(E, Par(E))| with respect to every E, where E∈Des(S).

In a case where signatures are individually written on all the items, it is necessary to perform signature computation n times. In the method according to the embodiment of the present invention, however, it is sufficient to perform signature computation one time. In ordinary cases, signature computation is considerably heavy processing in comparison with hash computation. It can therefore be said that the method in the embodiment of the present invention is effective when n is large.

The signature computation algorithm includes computation of ATR and computation for signature verification. If, with respect to each E, where E∈Des(S), ItemSet(E,Par(E))∩ItemSet(S,V)≠Φ (now assuming that the number of such entities is m), |ItemSet(E,Par(E))|=$n_E$; the number of Sub Authentication Trees constituted by the hash value contained in $V_E$ is $t_E$; and the number of leaf nodes of the ith Sub Authentication Tree in those Sub Authentication Trees is $n_{Ei}$, the order of the number of times hash computation is performed is shown by the following expression:

$$2n_E - 1 - \sum_{i=1}^{t_E}(2n_{Ei} - 1)$$

Number of items delivered from each entity to next entity Assuming the average of (ItemSet(E,Par(E))) is $n_{avg}$, the number of times hash computation is performed is O(m($n_{avg}$−n')). Also, the number of times computation for signature verification is performed is m. The value n' is assumed to be the average of |ItemSet(E,Par(E))|−|ItemSet(S,V)∩ItemSet(E,Par(E))| with respect to every E, where E∈Des (S). In a case where signatures are individually written on all the items, the number of times verification is performed is m'$n_s$, where m' is the average of the number of entities through which the delivered items are passed, and $n_s$=|ItemSet(S,V)|. In traceability or the like to be achieved by the present invention, m'≦m, m=m', $n_a$=vg $n_s$ In ordinary cases, computation for signature verification is considerably heavy processing in comparison with hash computation. It can therefore be said that the method in the embodiment of the present invention is effective when m<<$n_s$ (assumed to be a condition which applies to the present invention).

Description will be made as to what amount of data is sent when an entity sends the items by writing the signature in the embodiment of the present invention. The signature in the embodiment of the present invention includes path verification information $V_E$ and signature value $Sig_E$ with respect to each entity E through which items have been passed. If, when a signer S sends items to the next entity, the entity E is one of Des (S), hash values corresponding to the number of Sub Authentication Trees formed by items:

ItemSet(E,Par(E))−(ItemSet(E,Par(E))∩ItemSet(S, Par(S))) are contained in $V_E$. If the average of the number thereof is t and |Des(S)|=m, mt number of hash values are held. While t changes depending on the combination of items not sent in ItemSet (E,Par (E)), 0≦t≦n where n is the average of |ItemSet (E,Par(E))|. Further, path verification information contained in the signature in the embodiment of the present invention must include information as to which node in the Authentication Tree each hash value corresponds to.

Since there is one $Sig_E$ in each entity, m signature values according to the ordinary signature method exist. In a case where signatures are individually written on all the items, if |ItemSet(S,V)|=$n_S$ and the average of the numbers of entities through which the items have been passed is m', the number of signature values is $n_S$m'. In the present invention, the hash function and signature schema used are not specified. The actual efficiency of these depends on a selected hash function and signature schema.

Description will be made of an actual example of the above-described algorithms. In this example, each item is moved between entities as shown in FIG. 2, each entity being a signer, the next entity being a verifier. An examination will be made as to how the signature and verification algorithms are actually applied.

FIG. 10 shows a situation where signatures are written as described below when A sends items to D.

(Step 1)

Entity A first selects items $IA_1$, $IA_2$, and $IA_3$ as items to be sent to entity D (item group $I_A$).

(Step 2)

Because Des(A)=Φ, update of $V_E$ with respect to E∈Des(A) is not performed.

(Step 3)

A sets ATR({H($IA_1$), H($IA_2$), H($IA_3$)})=$HR_A$, generates signature $Sig_A$ ($HR_A$), and sets this as $Sig_A$.

(Step 4)

A sends signature {null, $Sig_A$} and item group {$IA_1$, $IA_2$, $IA_3$} to D.

Shaded blocks (101 to 106) shown in FIG. 10 indicate information to be sent to the next entity. Unshaded blocks (107 to 109) indicate information which is necessary for signature computation and verification, which is a value that can be computed only from the information indicated by the blocks 101 to 106, and which is not send to the next entity. Signature when B sends items to D is performed in the same manner. B sends signature {null, $Sig_B$} and item group $I_B$={$IB_1$, $IB_2$, $IB_3$} to D. Similarly, when C sends items to E, C sends signature {null, $Sig_C$} and item group $I_C$={$IC_1$, $IC_2$, $IC_3$} to E.

D receives the items from A and B and verifies the signatures on the items. For example, A's signature is verified as described below.

(Step 1)

Only A exists as entity E with $Sig_{chi(E)}$ not belonging to $V_E$. While $V_A$=null, {H(I)|I∈ItemSet(A,D)} can be computed from $I_A$. $HR_A$ is computed therefrom to verify the signature.

(Step 2)

Since A is the signer, the process advances to the next step.

(Step 3)

If $Sig_A$ is correctly verified at this stage, D accepts the item group $I_A$ and A's signature. D and E perform verification of the B's and C's signatures in the same way.

An example of signature and verification when D receiving the items from A and B sends the items to F will next be described.

(Step 1)

As shown in FIG. 11, D selects {$IA_2$, $IA_3$, $IB_3$, $ID_1$, $ID_2$}=$I_D$ as items to be sent to F.

(Step 2)

Now, Des(D)={A,B}. Accordingly, $V_A$ and $V_B$ are updated. First, for update of $V_A$, ATN({H(I)|I∈ItemSet(A, D)∩ItemSet(D, F)}/{H(I)
  |I∈ItemSet(A, D)})={H($IA_1$)} is obtained and included in $V_A$. At this time, this value is made identifiable as a node in a tree structure such as shown in FIG. 11 (the corresponding node position is added).

Similarly, ATN shown below is included in $V_B$.

ATN({H(I)|I∈ItemSet(B,D)∩ItemSet(D,F)}/{H(I)
  |I∈ItemSet(B, D) })={$HB_1$}

(Step 3)

Subsequently, ATR({H(I)|I∈$I_D$}=$HR_D$ is computed and $Sig_D$($HR_D$||H($Sig_A$)||H($Sig_B$))

is computed and set as $Sig_D$.

(Step 4)

$V_D$={{$V_A$, $Sig_A$}, {$V_B$, $Sig_B$}} is set and {$V_D$, $Sig_D$} and $I_D$ are sent to F. Signature by E is also performed in the same way.

$V_E$={$V_C$,$Sig_C$}($V_C$={H($IC_2$)},$Sig_C$=$Sig_C$($HR_C$)),$Sig_E$
  ($HR_E$||H($Sig_C$))

is set and signature {$V_E$, $Sig_E$} and item group $I_E$ are sent to F. F receiving these verifies the signature. The procedure for this verification will not be described. Instead, a more complicated example of signature verification when F subsequently delivers items to G will be described.

An example of sending items from F to G will be examined with reference to FIG. 12. At this time, F writes a signature as described below.

(Step 1)

F selects {$IA_2$, $ID_1$, $ID_2$} from the received items, adds an item $IF_1$, stored in itself in advance, and sends an item group $I_F$={$IA_2$, $ID_1$, $ID_2$, $IF_1$} to G.

(Step 2)

Des(F)={A, B, C, D, E}. E corresponds to the entity: (Par(X)=F)∧(ItemSet (X, F)∩ItemSet (F, G)=Φ). Accordingly, {$V_E$, $Sig_E$} is ignored ({$V_C$, $Sig_C$} contained in $V_E$ is also ignored). Where each of the remaining entities {A, B, D} is X, computation described below is performed to update $V_X$.

ATN({H(I)|I∈ItemSet(X,Par(X))∩ItemSet(F,G)}/{H(I)
  |I∈ItemS et (X, Par (X) ) })

With respect to the entity with ItemSet(X, Par(X))∩ItemSet(F, G)=Φ, $V_X$=H($Sig_X$) is set and $Sig_X$ is discarded. As a result, an update is made as shown by $V_A$={H($IA_1$), $HA_2$}, $V_B$={H($Sig_B$)}, $V_D$={{$V_A$, $Sig_A$}, {$V_B$}, H($IA_3$), H($IB_3$)}.

(Step 3)

F computes ATR(H($IA_2$), H($ID_2$), H($ID_2$), H($IF_1$) )=$HR_F$, writes a signature in the form of $Sig_F$($HR_F$||H ($Sig_D$)) and sets this as $Sig_F$.

(Step 4)

$V_F$={$V_D$, $Sig_D$} is set and then {$V_F$, $Sig_F$} and $I_F$ are sent to G.

G receives these and verifies the channel for each item as described below.

(Step 1)

Only A exists as an entity having $Sig_X$ and with $Sig_{Chi(x)}$ not belonging to $V_X$. Accordingly, $Sig_A$ is first verified from $V_A$. $V_A$ contains H($IA_1$) and $HA_2$, and $HR_A$ can be computed by using $IA_2$ contained in $I_F$. Therefore $Sig_A$ can be verified.

(Step 2)

D is the only entity that is Par(X) with respect to X in step 1. Then, similarly, $HR_D$ is obtained and $Sig_D$ is verified from H($Sig_A$) and H($Sig_B$).

(Step 3)

$Sig_F$ is verified by computing $HR_F$ from $I_F$. If the result of this verification is successful, it can be understood that $IA_2$ has come via A→D→F, $ID_1$ and $ID_2$ have come via D→F, and $IF_1$ has come via F.

As described above, use of the signature method according to the embodiment of the present invention ensures that in a situation where a large amount of items are sent from an entity to another entity and several ones of the items are thereafter delivered to a different entity, the validity of information as to which entity each item has been actually passed through can be assured. Also, each entity cannot negate the validity (as long as the signature method used on $Sig_E$ assures the validity).

For example, in the process of distributing commodities through various channels in a supply chain, the signature method according to the embodiment of the present invention can be applied to each commodity. If suppliers are substituted for the entities described above and if commodities are substituted for the items, it is possible to show that each commodity has actually passed through the entities identified from signatures.

In a supply chain, a situation is usually observed in which a multiplicity of commodities are put in one box and batches of several such boxes are distributed. An ordinary situation is also conceivable in which a supplier receiving a batch of goods treats a portion of it (e.g., the first ten boxes) as one unit and delivers the portion to another supplier. The signature method according to the embodiment of the present invention becomes more efficient if a collective part of items corresponding to leaf nodes of an Authentication Tree in a distribution process are removed. It can therefore be said that the embodiment of the present invention is suitable for a supply chain where a situation such as the above-described case in which a collective part of items are removed can occur easily. On the hand, even if a collective part is dispersed, the verifiability of signatures is not lost, and flexible combinations of items can be accommodated.

The embodiment of the present invention can also be applied to a distribution process including a process of assembling component parts, e.g., a process for a motor vehicle factory. FIG. 13 shows an example of such an application. Parts suppliers, e.g., A (131) and B (132) in FIG. 13 provide component parts to an entity, e.g., C (133) which performs assembly. The entity C assembles the component parts and ships $IC_1$ (134) thereby formed. Even in such a case, the embodiment of the present invention may be directly applied by regarding each item as independent to enable verification of an assembled item as to from what entity a constituent item has been supplied.

Some assembled items are not forwarded after assembly (or forwarded to a different entity). In such a case, all the items in each assembled item are also not forwarded. It is generally supposed that when purchased members are used for assembly, almost all of them are sequentially consumed (it is not easily conceivable that the same kind of members purposely purchased are used in a changed sequence). Under such circumstances, therefore, if a component (or a product) in which a number of parts are assembled is removed, a collective part of the leaf nodes of the Authentication Tree are removed, so that the effect of improving the signature efficiency according to the embodiment of the present invention becomes noticeable.

A plurality of processes through which each item is necessarily passed (e.g., certain inspection processes) exist as well as item distribution processes such as those described above. The present invention can also be used for verification as to whether or not each item has been actually passed through such processes.

The above-described embodiment can be realized by means of a program executed on a computer system. Such a program can be provided in a state of being stored on a recording medium. As a recording medium for this use, a magnetic recording medium such as a floppy (trademark) disk, an optical recording medium such as a CD-ROM, a DVD or a PD, a magneto-optic recording medium such as an MD, a tape medium, a semiconductor memory such as an IC card, or the like can be used. The above-described program may be provided to the computer system through the medium of a storage device such as a hard disk or a RAM provided in a server system connected to a network.

The present invention has been described with respect to the embodiment thereof. However, the technical scope of present invention is not limited to the described embodiment. Various changes or modifications can be made in the above-described embodiment. It is apparent from the description in the appended claims that forms provided by making such changes or modifications are also included in the technical scope of the present invention.

The invention claimed is:

1. A multiple signature system for verifying a delivery route for items comprising:
   at least one signature device at a location for generating signature information on items; and
   at least one signature verification device for verifying the signature information on received items, wherein said at least one signature device and said at least one signature verification device are connected to communicate with each other,
   and wherein said at least one signature device comprises:
   an item selection input section for accepting selection of a group of items formed by combining a delivered item delivered from at least one supplier and an item generated at the signature device location;
   a path verification information updating section for updating path verification information for verifying a delivery route included in signature information of the delivered;
   a signature information preparation section for preparing new signature information from a signature prepared by said at least one signature device and the updated path verification information with respect to a selected item group; and
   a signature information transmitting section for transmitting the new signature information to the at least one signature verification device,
   and wherein the at least one signature verification device comprises:
   a signature information receiving section for receiving the new signature information; and
   a signature information verification section for verifying delivery routes for all the items included in the selected item group based on the new signature information.

2. The multiple signature system according to claim 1, wherein the signature information preparation section prepares a signature using a Merkle tree, said preparing comprising the steps of, repeating concatenation of hash values with respect to nodes of a binary tree structure having items as leaf nodes, and computing the hash value of a route node of said tree structure.

3. The multiple signature system according to claim 1, wherein the signature device further comprises an item identification (ID) transmitting section which transmits to the signature verification device IDs for all items included in the selected item group and said new signature information.

4. A multiple signature method of verifying a delivery route for at least one item in a system comprising a signature device at a location for generating signature information for an item connected to communicate with a signature verification device for verifying the signature information on a received item, the method comprising the steps of:
   accepting a selection of a group of items formed by combining an item delivered from at least one supplier and an item generated at said location;
   updating path verification information to verify a delivery route included in the signature information on the delivered item;
   preparing new signature information from a signature prepared by said signature device and the updated path verification information with respect to the selected item group; and
   transmitting the new signature information to the signature verification device; and verifying the delivery routes for all the items included in the selected item group at said signature verification device based on the new signature information.

5. The multiple signature method according to claim 4, wherein the preparing of the signature information uses a Merkle tree, said preparing comprising the steps of repeating concatenation of hash values with respect to nodes of a binary tree structure having items as leaf nodes, and computing the hash value of a route node of said tree structure.

6. The multiple signature method according to claim 4, further comprising transmitting identifications (IDs) for all the items included in the selected item group to the signature verification device when transmitting the new signature information to the signature verification device.

7. A multiple signature program product for verifying a delivery route for an item in a system having a signature device which generates signature information on an item and is connected to communicate with a signature verification device which verifies the signature information on a received item, the program product enabling the signature device to perform by means of a computer method steps comprising:

accepting a selection of a group of items formed by combining an item delivered from at least one supplier and an item generated at said location;

updating path verification information to verify a delivery route included in the signature information on the delivered item;

preparing new signature information from a signature prepared by said signature device and the updated path verification information with respect to the selected item group; and transmitting the new signature information to the signature verification device; and verifying the delivery routes for all the items included in the selected item group at said signature verification device based on the new signature information.

8. The multiple signature program product according to claim 7, the program product enabling the signature device to perform by means of the computer a function to prepare a signature using a Merkle tree, said preparing comprising steps of repeating concatenation of hash values with respect to nodes of a binary tree structure having items as leaf nodes, and computing the hash value of the route node.

* * * * *